US012212388B2

(12) United States Patent
Gao et al.

(10) Patent No.: US 12,212,388 B2
(45) Date of Patent: Jan. 28, 2025

(54) SENSING BASED DYNAMIC BEAMS

(71) Applicant: QUALCOMM Incorporated, San Diego, CA (US)

(72) Inventors: Kang Gao, San Diego, CA (US); Vasanthan Raghavan, West Windsor Township, NJ (US); Yongle Wu, San Diego, CA (US); Jun Zhu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 18/324,323

(22) Filed: May 26, 2023

(65) Prior Publication Data
US 2024/0396598 A1 Nov. 28, 2024

(51) Int. Cl.
*H04B 7/06* (2006.01)
*H04B 7/0456* (2017.01)

(52) U.S. Cl.
CPC ................. *H04B 7/0456* (2013.01)

(58) Field of Classification Search
CPC ................................... H04B 7/0456
USPC ........................ 375/265, 267, 299
See application file for complete search history.

(56) References Cited

U.S. PATENT DOCUMENTS

| 2013/0235807 | A1* | 9/2013 | Lee | H01Q 1/246 370/329 |
| 2019/0123864 | A1* | 4/2019 | Zhang | H04L 5/005 |
| 2021/0344395 | A1* | 11/2021 | Rafique | H04B 7/0634 |
| 2021/0376907 | A1* | 12/2021 | Zhu | H04B 7/0626 |
| 2022/0200676 | A1 | 6/2022 | Raghavan et al. | |
| 2022/0210799 | A1* | 6/2022 | Zhu | H04B 7/0695 |

FOREIGN PATENT DOCUMENTS

| EP | 2246937 A1 | 11/2010 |
| WO | 2022178498 A1 | 8/2022 |
| WO | 2023086706 A1 | 5/2023 |

OTHER PUBLICATIONS

International Search Report and Written Opinion—PCT/US2024/027658—ISA/EPO—Aug. 19, 2024.

* cited by examiner

*Primary Examiner* — Emmanuel Bayard
(74) *Attorney, Agent, or Firm* — QUALCOMM Incorporated

(57) ABSTRACT

Example implementations include a method, apparatus and computer-readable medium for wireless communication configured for estimating a channel using a set of predefined sensing beams to measure reference signals. Estimating the channel may include generating an N×N channel correlation matrix, where N is a number of antenna elements in the antenna array. The implementations further include generating a set of dynamic beam weights to maximize a reference signal received power (RSRP) based on the estimated channel. The set of dynamic beam weights may be based on an eigenvector of the channel correlation matrix. Additionally, the implementations further include applying the set of dynamic beam weights to an antenna array.

20 Claims, 9 Drawing Sheets

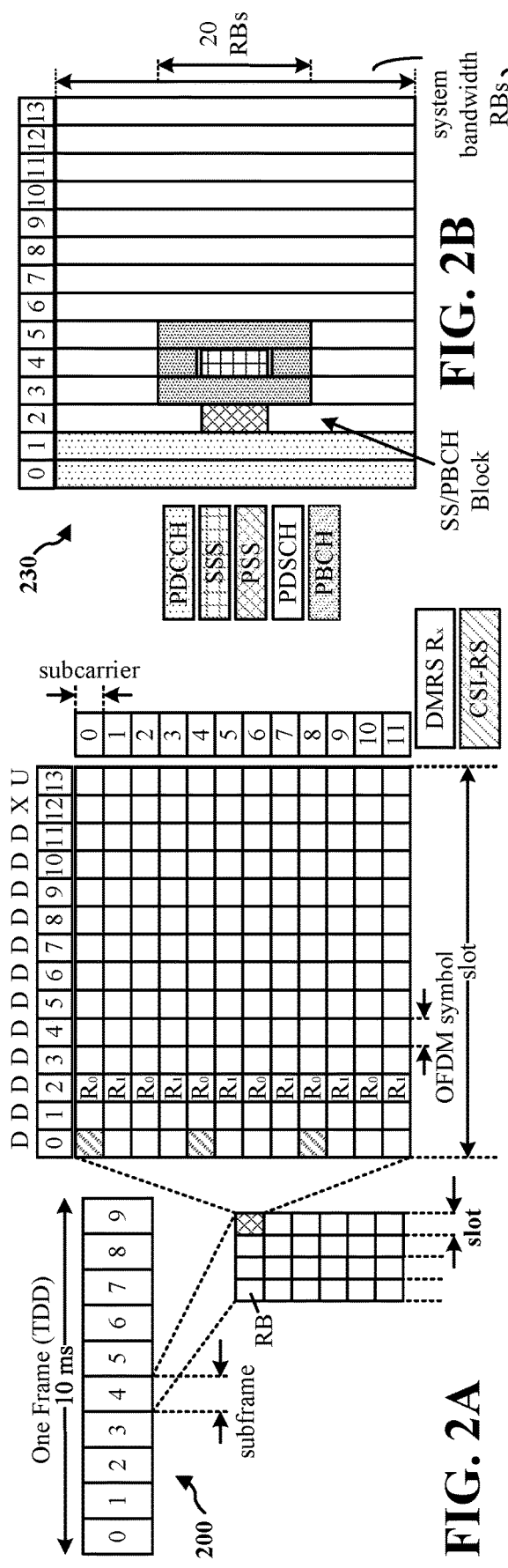
FIG. 2A
FIG. 2B
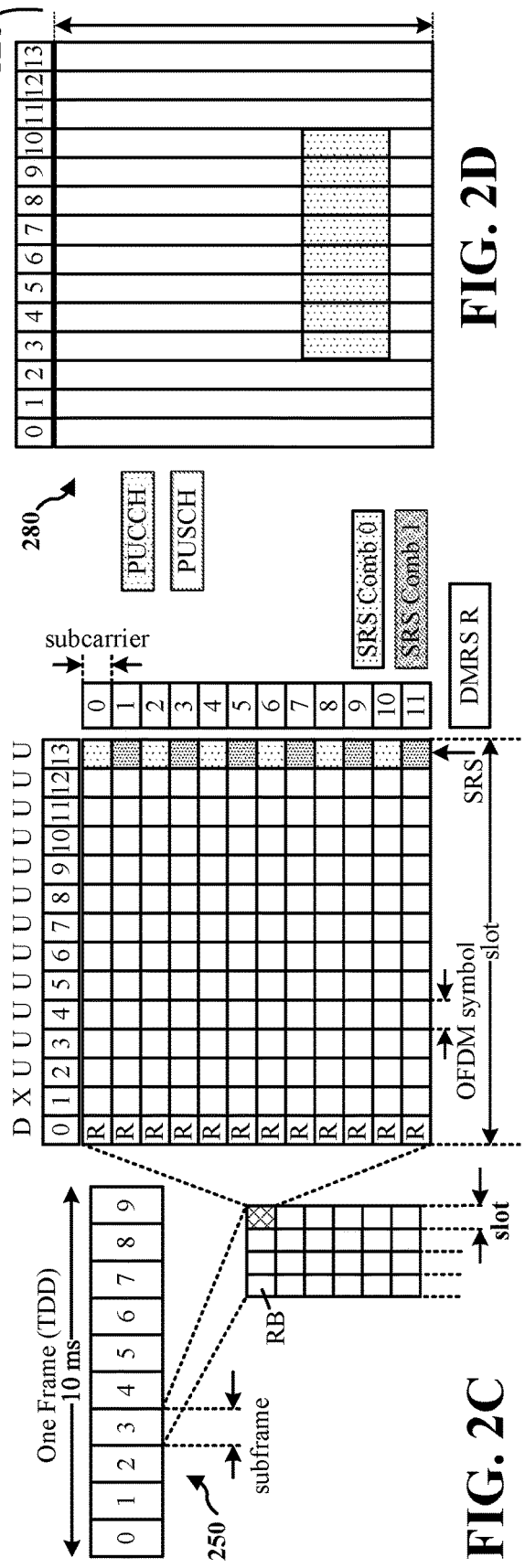
FIG. 2C
FIG. 2D

SENSING BASED DYNAMIC BEAMS

BACKGROUND

Technical Field

The present disclosure relates generally to communication systems, and more particularly, to sensing based dynamic beams.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus for wireless communication at a user equipment (UE) are provided. The method includes: estimating a channel using a set of predefined sensing beams to measure reference signals; generating a set of dynamic beam weights to maximize a reference signal received power (RSRP) based on the estimated channel; and applying the set of dynamic beam weights to an antenna array.

In some aspects, the techniques described herein relate to a method of wireless communication, including: estimating a channel using a set of predefined sensing beams to measure reference signals; generating a set of dynamic beam weights to maximize a reference signal received power (RSRP) based on the estimated channel; and applying the set of dynamic beam weights to an antenna array.

In some aspects, the techniques described herein relate to an apparatus for wireless communication, including: one or more memories, individually or in combination, having instructions; and one or more processors coupled to the one or more memories and, individually or in combination, configured to: estimate a channel using a set of predefined sensing beams to measure reference signals; generate a set of dynamic beam weights to maximize a reference signal received power (RSRP) based on the estimated channel; and apply the set of dynamic beam weights to an antenna array.

In some aspects, the techniques described herein relate to an apparatus for wireless communication, including: means for estimating a channel using a set of predefined sensing beams to measure reference signals; means for generating a set of dynamic beam weights to maximize a reference signal received power (RSRP) based on the estimated channel; and means for applying the set of dynamic beam weights to an antenna array.

In some aspects, the techniques described herein relate to a computer-readable medium including stored instructions for wireless communication, wherein the instructions are executable by a processor to: estimate a channel using a set of predefined sensing beams to measure reference signals; generate a set of dynamic beam weights to maximize a reference signal received power (RSRP) based on the estimated channel; and apply the set of dynamic beam weights to an antenna array.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of downlink (DL) channels within a subframe, in accordance with certain aspects of the present description.

FIG. 2C is a diagram illustrating an example of a second frame, in accordance with certain aspects of the present description.

FIG. 2D is a diagram illustrating an example of uplink (UL) channels within a subframe, in accordance with certain aspects of the present description.

DETAILED DESCRIPTION

Figure 1:
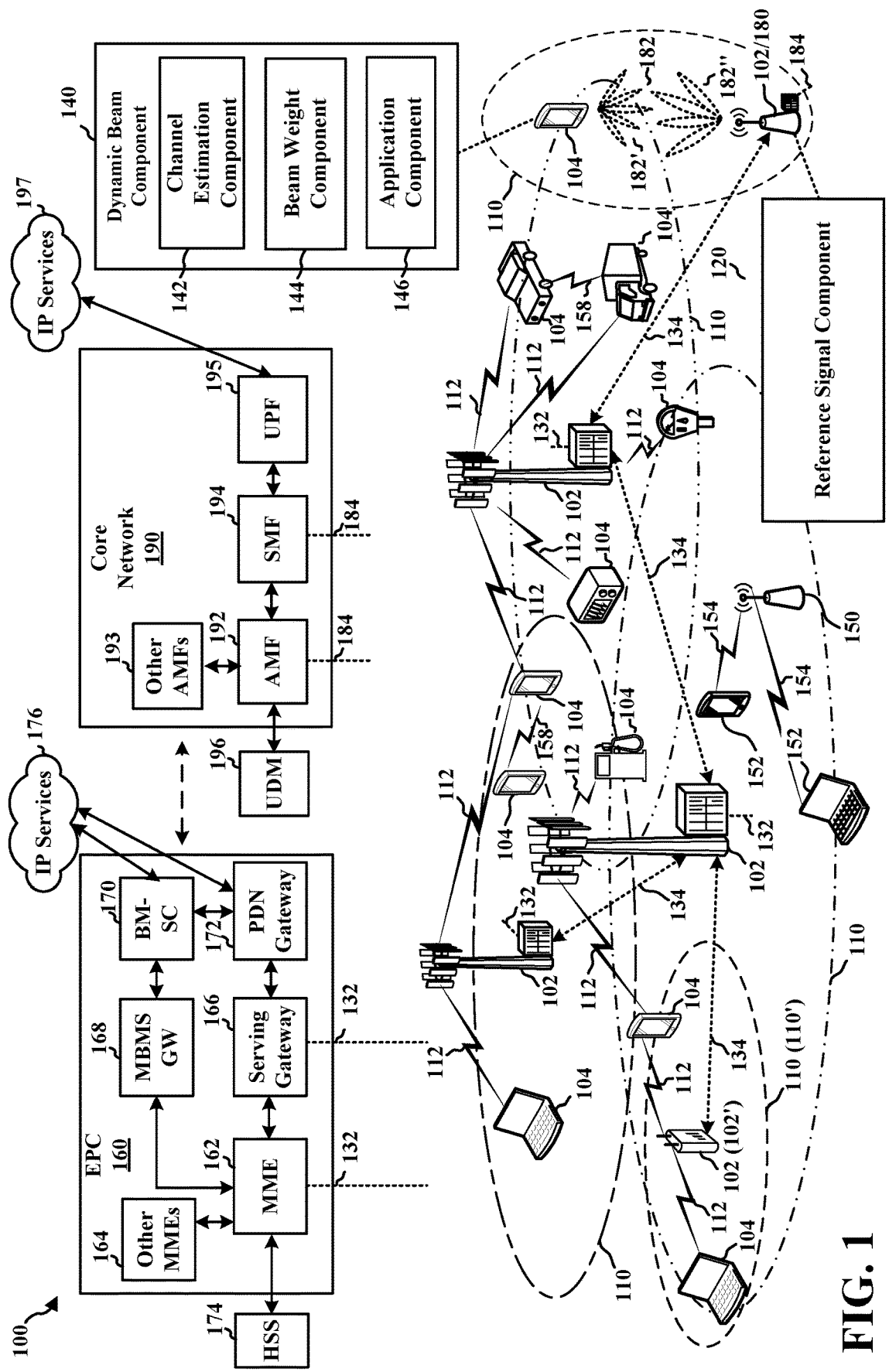
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR. the concepts described herein may be applicable to other similar areas, such as LTE, LTE-A, CDMA, GSM, and other wireless technologies.

In conventional user equipment (UE), a UE may be indicated with or select a beam from a codebook of static beams for transmission or reception. Legacy static beams are designed for a free space environment for an in-coverage region to achieve high reference signal received power (RSRP), but static beams may not be optimal when the electric field is changed due to hand blockage, non-line-of-sight channel, or other materials like metal table or UE housing. Even in a free space out of coverage region, static beams may not be ideal. That is, when a UE is limited to a set of pre-defined static beams in a codebook, there may exist better beam weights for a particular environment. Beam selection or training based on a codebook may also include overhead for additional reference signals on different beams and/or indications of preferred beams.

In an aspect, the present disclosure provides techniques for generating sensing based dynamic beams. Dynamic beams refers to techniques that allow adaptive changes to weights used for beamforming based on changes in the channel environment to achieve better signal quality (e.g., RSRP). In order to generate dynamic beams, the channel information is required. The channel information can be described by a channel correlation matrix, R.

In an aspect, the channel correlation matrix may be obtained through some measurement using pre-determined sensing beams. One technique to obtain the R matrix for an N-element subarray (e.g., an N×N channel correlation matrix) uses $N^2$ RSRP measurements. Another technique is to use channel impulse response based measurements, which may require fewer measurements. A set of dynamic beam weights may be generated from the channel correlation matrix that maximizes a RSRP based on the estimated channel. In some implementations, the set of dynamic beam weights may be generated by quantizing values of the eigenvector of the channel correlation matrix. The set of dynamic beam weights may be applied to an antenna array. For example, the set of dynamic beam weights may be used to generate a receive beam and/or a transmit beam.

Particular implementations of the subject matter described in this disclosure can be implemented to realize one or more of the following potential advantages. The use of dynamic beam weights may improve reception and/or transmission of RF signals, especially in channel conditions for which pre-defined static beams are not designed such as blockage scenarios and non-line of sight. For example, signal quality (e.g., signal to noise ratio (SNR)) or spectral efficiency may be improved. Additionally, the gains may be applicable when the UE is rotated. In some implementations, the use of channel impulse response measurements to estimate the channel may improve the speed of channel estimation and dynamic beam generation over conventional measurements Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software (e.g., computer-executable instructions). The execution of the computer-executable instructions by one or more processors, individually or in combination, may cause an apparatus to perform the functions described herein. As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code (e.g., computer-executable instructions) on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

In an aspect, one or more of the UEs 104 may include a dynamic beam component 140 configured to dynamically generate a set of beam weights for use by the UE 104. The dynamic beam component 140 includes a channel estimation component 142 configured to estimate a channel using a set of predefined sensing beams to measure reference signals. In some implementations, the dynamic beam component 140 may include a beam weight component 144 configured to generate a set of dynamic beam weights to maximize a RSRP based on the estimated channel. The dynamic beam component 140 includes an application component 146 configured to apply the set of dynamic beam weights to an antenna array.

In an aspect, one or more of the base stations 102 may include a reference signal component 120 that performs the actions of the base station as described herein. For example, the reference signal component 120 may transmit one or more reference signals such as a synchronization signal block (SSB) or a channel state information reference signal (CSI-RS).

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D are resource diagrams illustrating example frame structures and channels that may be used for UL, DL, and sidelink transmissions to a UE 104 including a Dynamic beam component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The sub-carrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/ symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical UL control channel (PUCCH) and DM-RS for the physical UL shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries UL control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
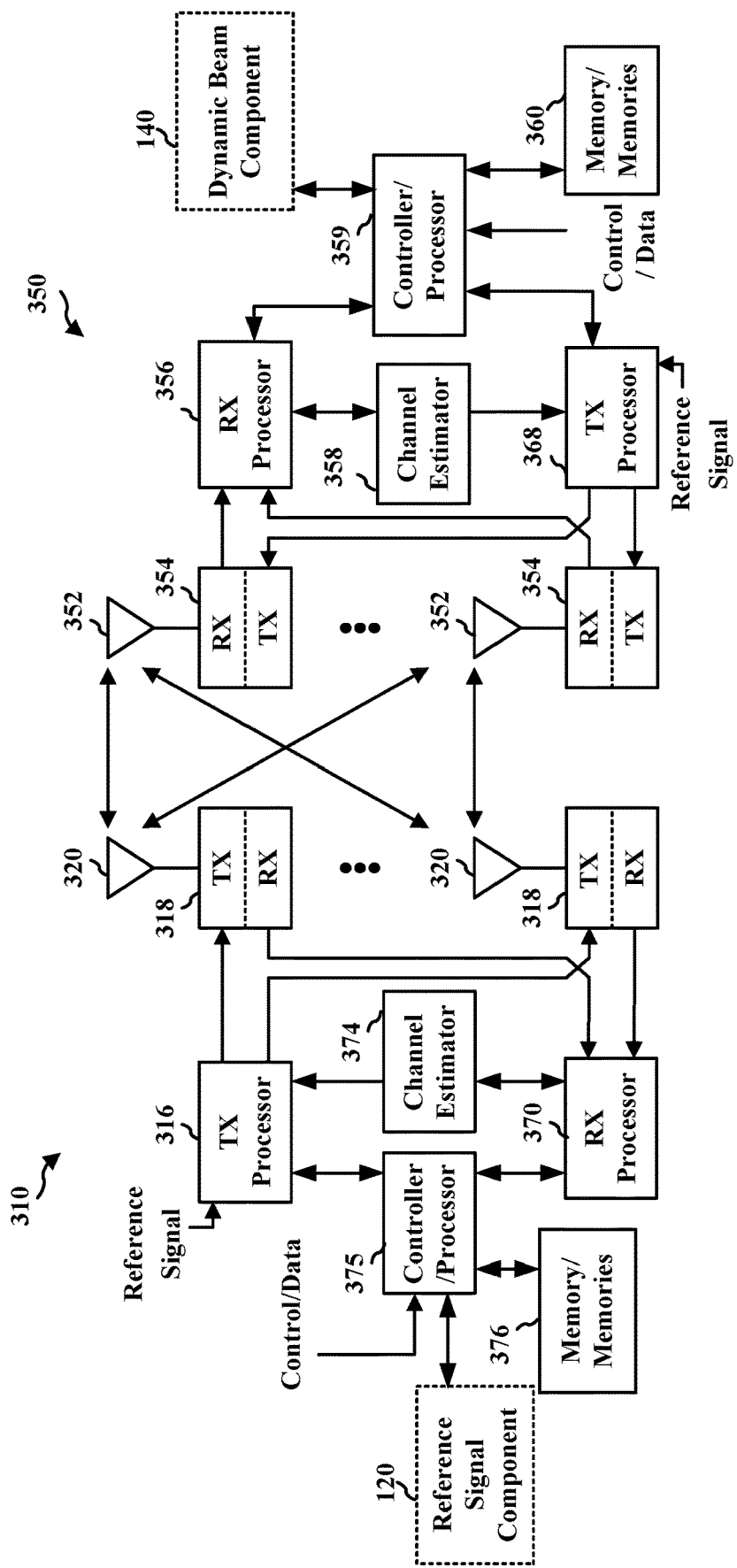
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with one or more memories 360 that store program codes and data. The memory/memories 360 may be referred to as a computer-readable medium/media. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a one or more memories 376 that store program codes and data. The memory/memories 376 may be referred to as a computer-readable medium/media. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the dynamic beam component 140 of FIG. 1. For example, the memory/memories 360 may include executable instructions defining the dynamic beam component 140. The Tx processor 368, the RX processor 356, and/or the controller/processor 359 may be configured to execute the dynamic beam component 140.

At least one of the Tx processor 316, the Rx processor 370, and the controller/processor 375 may be configured to perform aspects in connection with the reference signal component 120 of FIG. 1. For example, the memory/memories 376 may include executable instructions defining the reference signal component 120. The Tx processor 316, the Rx processor 370, and/or the controller/processor 375 may be configured to execute the reference signal component 120.

Figure 4:
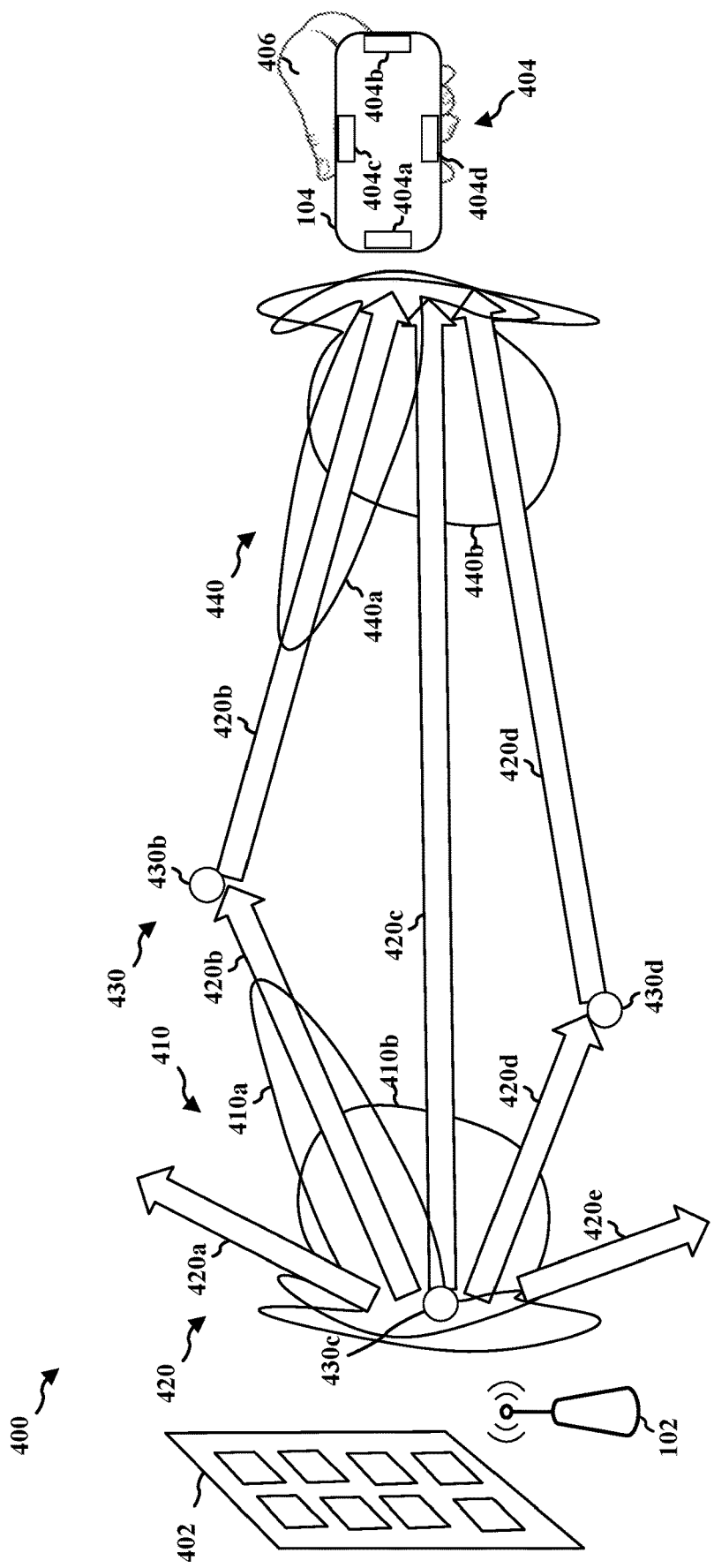
FIG. 4 is a conceptual diagram illustrating beams transmitted from a base station 102 to a UE, in accordance with certain aspects of the present description.

Turning to FIG. 4, a conceptual diagram 400 includes beams 410 transmitted from a base station 102 to a UE 104.

The beams 410 may be the result of different antenna configurations at the base station 102, which may typically include a large antenna array 402 for beam steering. For example, the beams 410 may include a first beam 410a that is relatively narrow and a second beam 410b that is relatively wide. The base station 102 may control beam weights to steer the beams 410 in a particular direction. For example, a channel may include multiple paths 420 (e.g., paths 420a-420e) between the base station 102 and the UE 104. For instance, a direct path 420c may exist if there is a line of sight between the base station 102 and the UE 104. An RF signal may also follow an indirect path. For example, the signal may reflect off an object such as a building, vehicle, or window.

From the perspective of the UE 104 including antenna modules 404 (e.g., antenna modules 404a, 404b, 404c, and 404d), the signal may appear to arrive from a certain direction via reflections or diffraction (typically called a cluster 430). A cluster (e.g., clusters 430b-430d) may be a reflected or a diffracted source of a signal that arrives at the UE 104. For example, a cluster 430c may correspond to the base station 102 and the clusters 430b and 430d may correspond to objects that reflect the signals in the indirect paths 420b and 420d, respectively. Other paths such as path 420a and 420e may not reach the UE 104 with sufficient signal strength. The UE 104 may have an active antenna configuration that generates a receive beam 440 (e.g., receive beams 440a and 440b). For example, the receive beam 440a may be generated by a first active antenna configuration and the receive beam 440b may be generated by a second active antenna configuration. The UE 104 may control antenna weights to steer the receive beam 440 towards one or more clusters 430. A strongest cluster may be referred to as a dominant cluster and other clusters may be referred to as sub-dominant clusters.

In some scenarios, the position of a hand 406 on the UE 104 may cause hand blockage that affects the receive beams 440. The deterioration may be approximately 0-40 dB depending on the angle of the cluster relative to the orientation and properties of the hand. Structures in the fingers of the hand can irregularly reflect energy. Such reflections may be mitigated with appropriate phase shifter and amplitude control adaptations. In some cases, beam switching may improve reception if beam switching latencies are small relative to time-scales at which data disruption are acceptable or at time-scales at which channel/cluster properties changes. These time-scales depend on UE mobility and use-cases. Further, legacy beam switching using codebooks and beam training may come at an overhead on a control channel, which may not be acceptable in some cases. In an aspect, sensing based dynamic beams may allow the UE 104 to dynamically change to beams that are suitable for channel conditions, even if a codebook does not include beams designed for the channel conditions.

Figure 5:
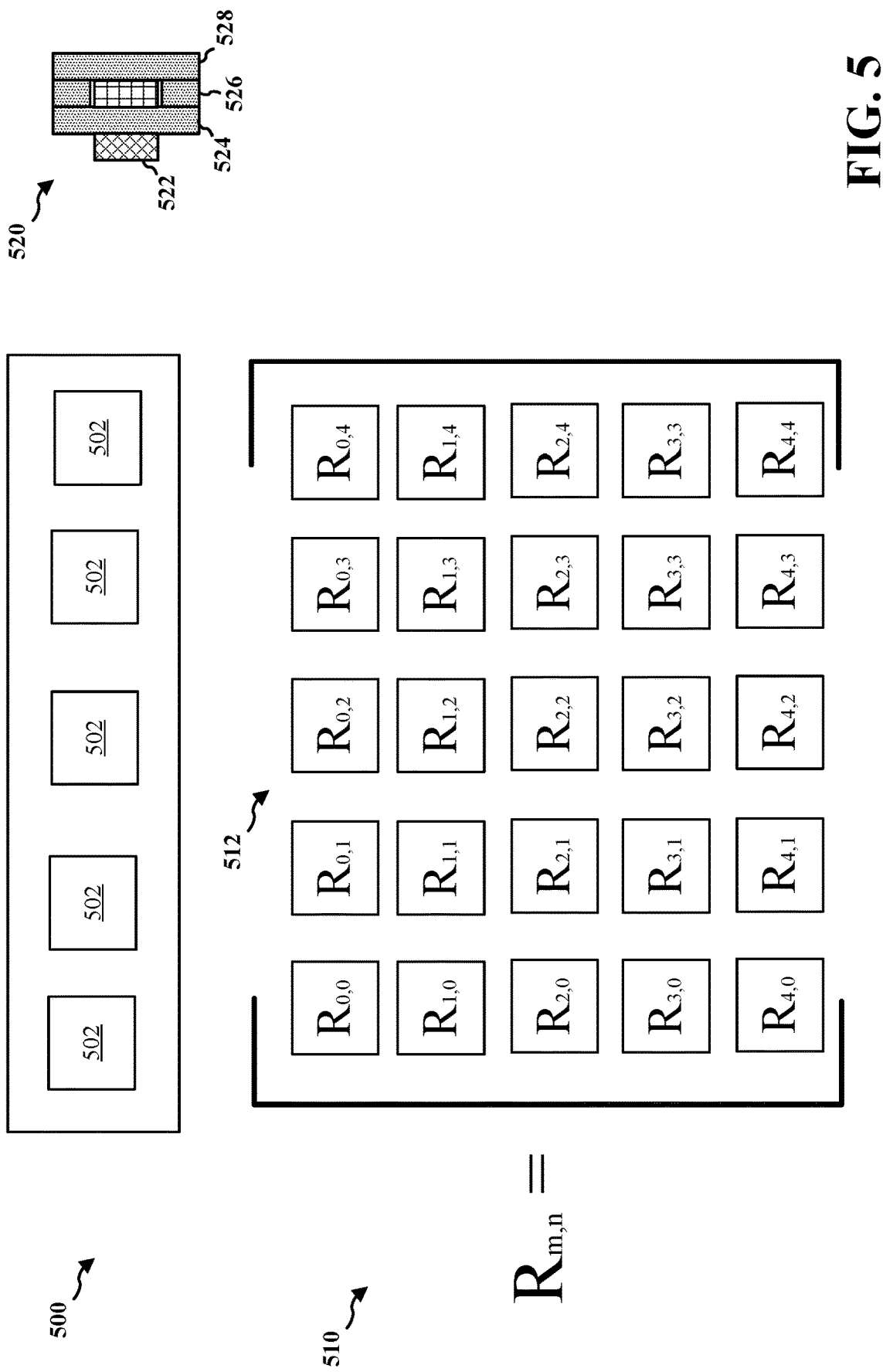
FIG. 5 illustrates an example channel correlation matrix for an antenna array, in accordance with certain aspects of the present description.

FIG. 5 illustrates an example channel correlation matrix 510 for an antenna array 500. The antenna array 500 may include a number of antenna elements, N. In the illustrated example, N is 5. In order to generate dynamic beams, channel information is required. The channel information may be represented as the channel correlation matrix 510. The channel correlation matrix 510 may be an N×N matrix, and may be referred to as R. Each element 512 in the channel correlation matrix 510 may be an RSRP corresponding to a sensing beam. A sensing beam may be a defined beam with a known weight. Each channel measurement may correspond to a different sensing beam. The channel measurements may be performed on a reference signal 520. In an aspect, the reference signal 520 may be an SSB including a first symbol 522 with a PSS, a second symbol 524 with SSS, a third symbol 526 with SSS and PBCH, and a fourth symbol 528 with SSS. Other reference signals such as CSI-RS may be used for measurements.

One method to obtain the R matrix for an N-element subarray uses $N^2$ RSRP measurements. For example, the RSRP measurements may be performed on SSBs using each sensing beam. Even if three beams are measured on each SSBS (e.g., on each of symbol 524, 526, and 528 including SSS), the RSRP measurements may use 9 SSBs.

In an aspect, the R matrix may be obtained using a channel impulse response (CIR) based method that can measure the CIR on each antenna element 502. A CIR (based method can greatly speed-up the N×N channel correlation matrix computation by using only about N measurements with $\hat{R}_{mn} = h_m^H h_n$. Here, $\hat{R}_{mn}$ is the estimate of m-th row and n-th column of R matrix, and $h_n$ is the CIR measured at the n-th elements. If the CIR is measured on three beams on each SSB, only 2 SSBs may be needed to determine the R matrix.

Because the RSRP of a beam with weight w can be estimated by using $RSRP_{est}(w) = w^H \hat{R} w$, the beam weight component 144 can generate a dynamic beam by using the eigenvector of the R matrix to maximize the RSRP. To satisfy the phase and magnitude constraint, the beam weight component 144 can further apply proper quantization of the phase and magnitude. The beam weight component 144 can therefore obtain the dynamic beams for both polarizations of the subarray, which are adapted to the channel to obtain higher RSRP than pre-designed static beams.

Figure 6:
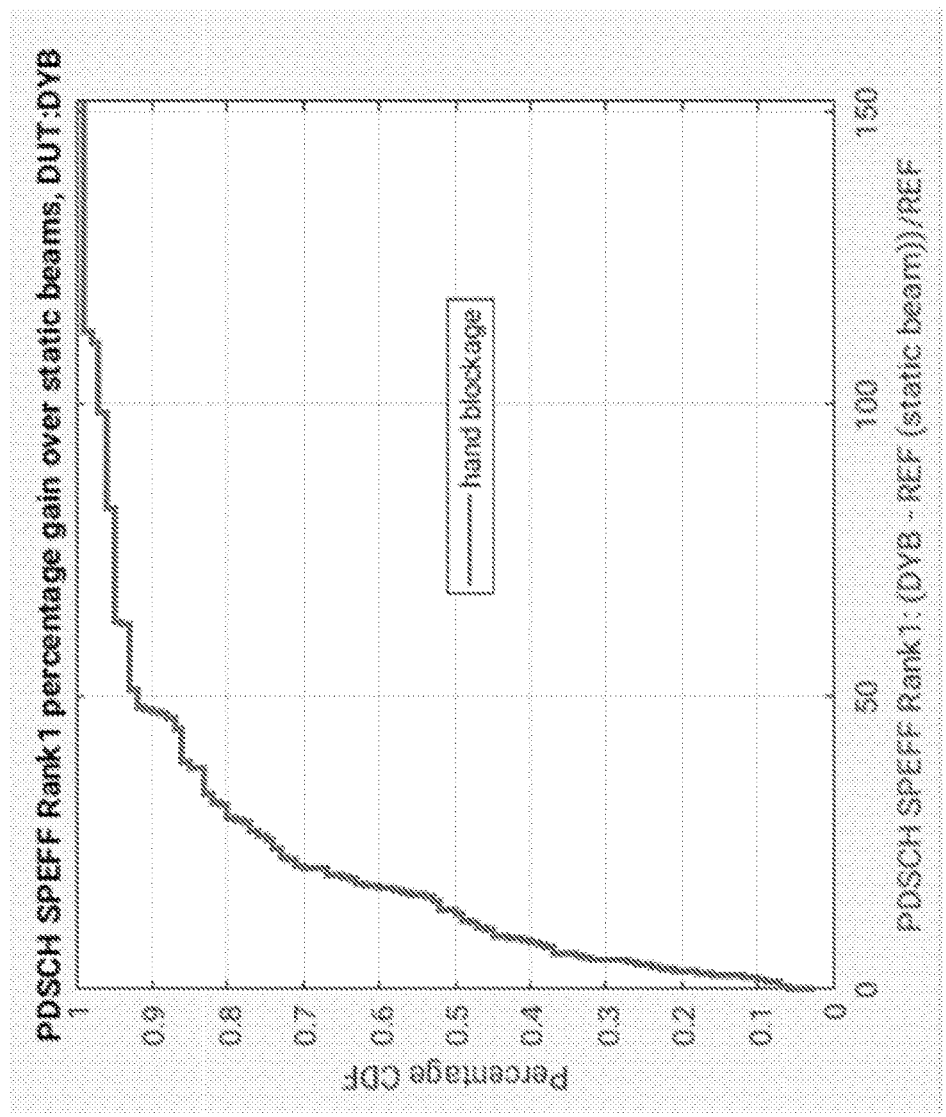
FIG. 6 is a chart illustrating performance gain of dynamic beams over static beams, in accordance with certain aspects of the present description.

FIG. 6 is a chart 600 illustrating performance gain of dynamic beams over static beams. The chart 600 illustrates a cumulative distribution function (CDF) of a spectral efficiency gains of dynamic beams over static beams for a rank 1 PDSCH in a stationary case with hand blockage. As illustrated, the dynamic beams provide some degree of gain in most scenarios, and can achieve over 50% gain for 10% of the orientations, and some orientations can reach a gain of more than 100%.

Figure 7:
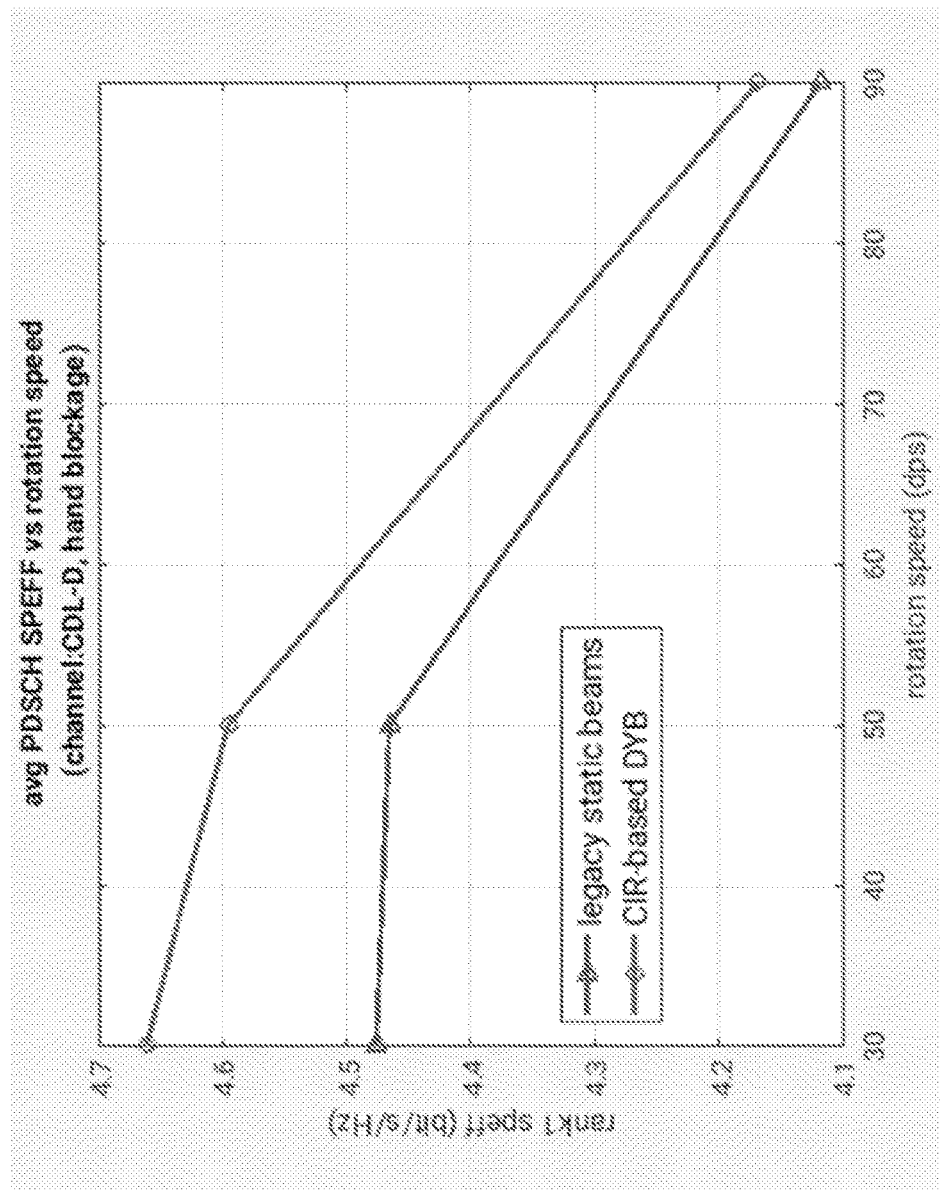
FIG. 7 is a chart showing spectral efficiency in rotating scenarios for both dynamic beams and static beams, in accordance with certain aspects of the present description.

FIG. 7 is a chart 700 showing spectral efficiency in rotating scenarios for both dynamic beams and static beams. Generally, the spectral efficiency decreases as rotation speed increases because the channel deteriorates until the beam is updated. The dynamic beams, however, provide a gain over static beams at all rotation speeds.

Figure 8:
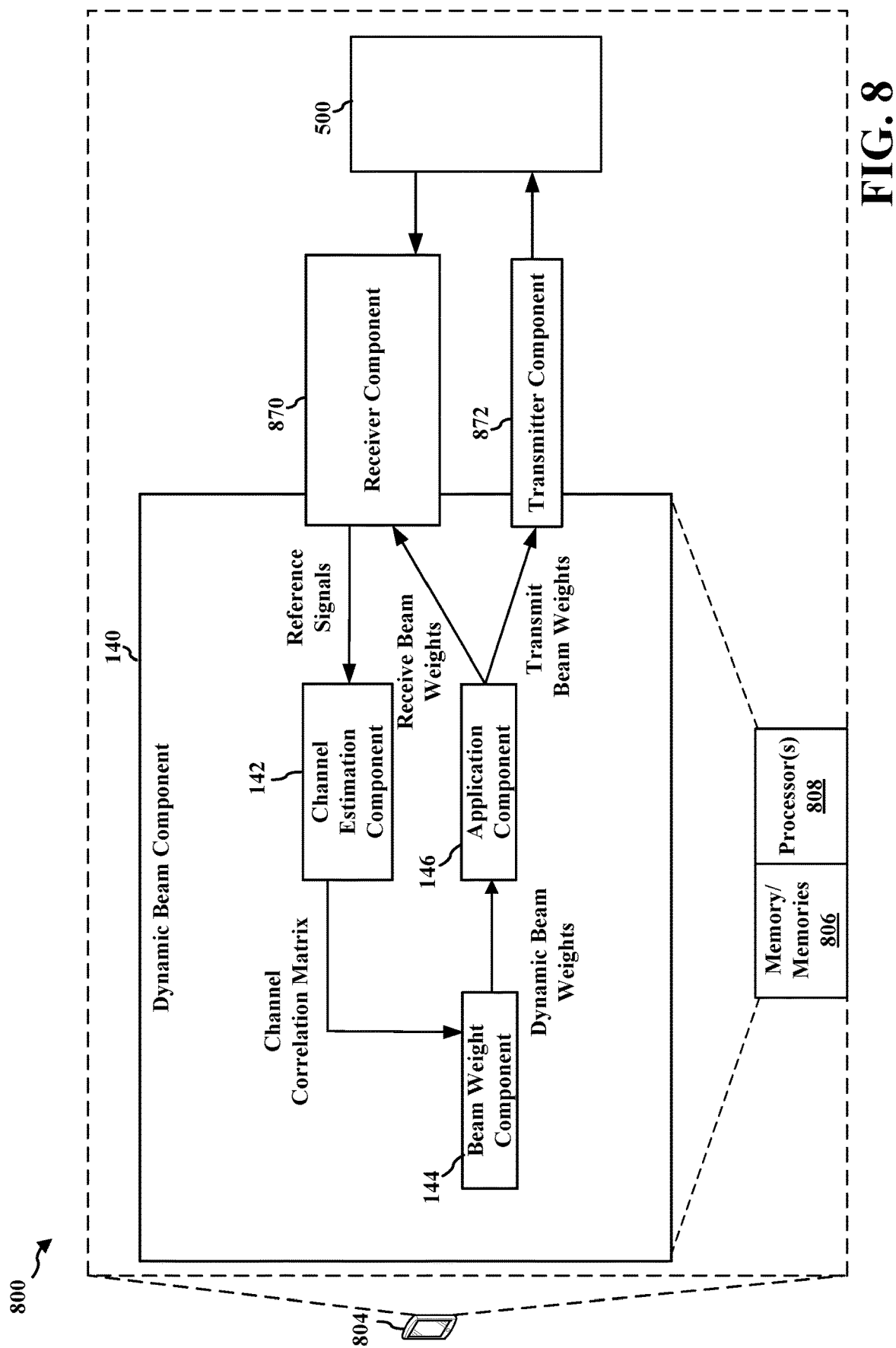
FIG. 8 is a conceptual data flow diagram illustrating the data flow between different means/components in an example UE, in accordance with certain aspects of the present description.

FIG. 8 is a conceptual data flow diagram 800 illustrating the data flow between different means/components in an example UE 804, which may be an example of the UE 104 and include the dynamic beam component 140. In some implementations, the dynamic beam component 140 may be implemented as instructions stored in one or more memories 806 that are communicatively coupled with one or more processor(s) 808. The one or more processor(s) 808, either individually or in combination, may execute the instructions to perform the functions of the dynamic beam component 140 and sub-components described herein.

As discussed with respect to FIG. 1, the dynamic beam component 140 may include the channel estimation component 142, the beam weight component 144, and the application component 146.

The UE 804 also may include a receiver component 870 and a transmitter component 872. The receiver component 870 may include, for example, a RF receiver for receiving the signals described herein. The transmitter component 872 may include for example, an RF transmitter for transmitting the signals described herein. In some implementations, the receiver component 870 and the transmitter component 872 may be co-located in a transceiver such as the TX/RX 354 in FIG. 3. The receiver component 870 and the transmitter component 872 may be connected to an antenna array 500.

The receiver component 870 may receive DL signals such as reference signals 520. The receiver component 870 may provide the reference signals 520 to the channel estimation component 142. The receiver component 870 may be configured with a set of dynamic beam weights for a receive beam for receiving the reference signals 520 and/or a data transmission.

The channel estimation component 142 is configured to receive, via the receiver component 870, the reference signals 520. The channel estimation component 142 may estimate a channel using a set of predefined sensing beams to measure the reference signals 520. For instance, the channel estimation component 142 may configure the receiver component 870 with the different predefined sensing beams for each symbol 524, 526, and 528 of the reference signal 520. In some implementations, the channel estimation component 142 may measure the RSRP of a respective reference signal for each element of the channel correlation matrix 510. In some implementations, the channel estimation component 142 may use the set of predefined sensing beams to measure a channel impulse response of the reference signal 520 at each antenna element 502. The channel estimation component 142 may output the channel correlation matrix 510 to the beam weight component 144.

The beam weight component 144 may be configured to generate a set of dynamic beam weights to maximize a RSRP based on the estimated channel. The beam weight component 144 may obtain the channel correlation matrix 510 from the channel estimation component 142. In some implementations, the beam weight component 144 may calculate the eigenvector of the channel correlation matrix 510 to determine the dynamic beam weights. The beam weight component 144 may quantize values (e.g., phase and magnitude) of the eigenvector of the channel correlation matrix. The application component 146 may generate receive beam weights and/or transmit beam weights. For example, the receive beam weights may maximize the RSRP of the reference signals 520. The transmit beam weights may be reciprocal transmit beam weights based on the receive beam weights. The beam weight component 144 may output the dynamic beam weights that maximize RSRP to the application component 146.

The application component 146 is configured to apply the set of dynamic beam weights to an antenna array 500. The application component 146 may obtain the dynamic beam weights from the beam weight component 144. The application component 146 may apply the receive beam weights to the receiver component 870 to receive a reference signal or transmission using the beam weights. The application component 146 may apply the transmit beam weights to the transmitter component 872 to transmit a sounding reference signal or a transmission with the transmit beam weights.

Figure 9:
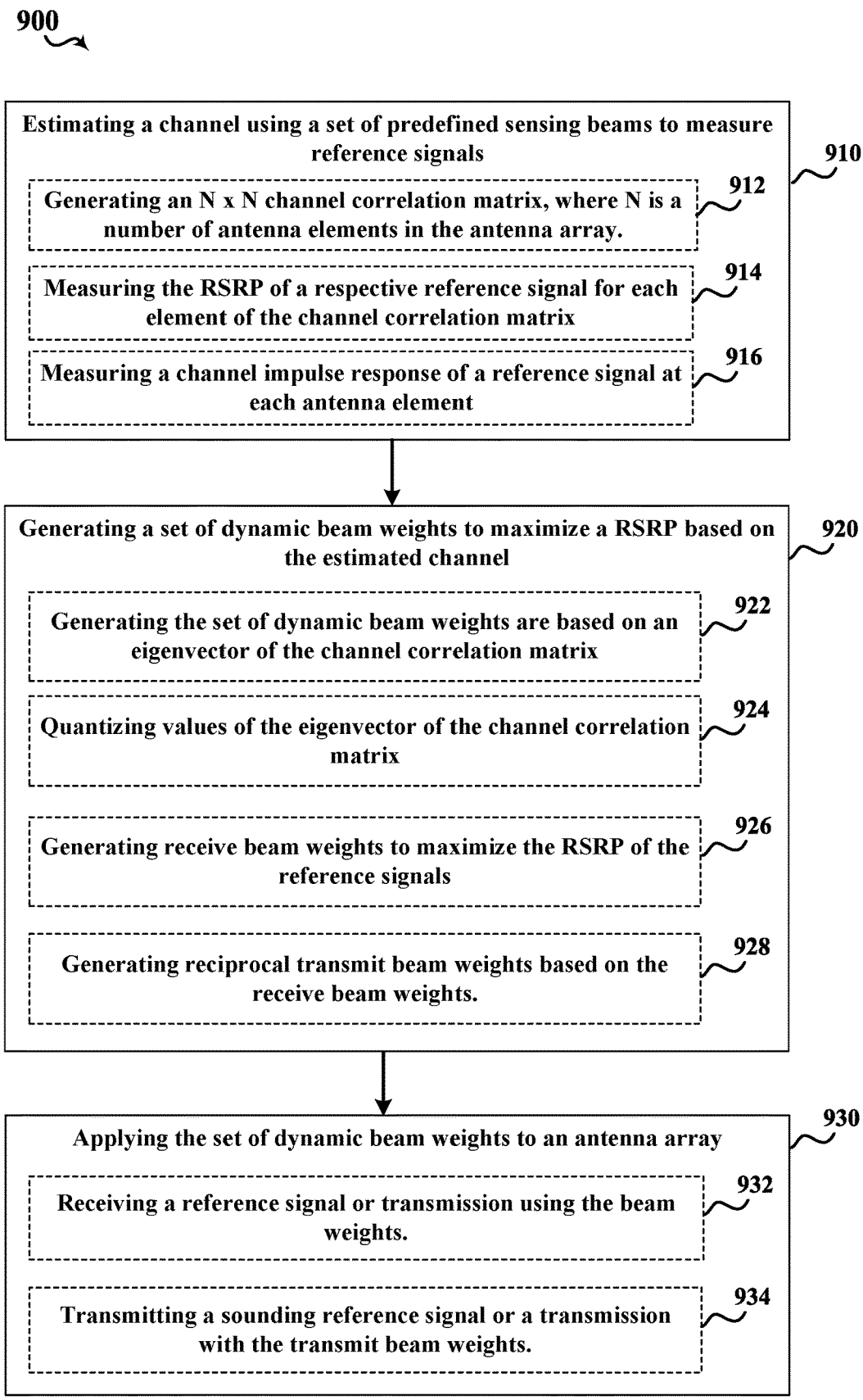
FIG. 9 is a flowchart of an example method for a UE to utilize dynamic beams based on a set of predefined sensing beams, in accordance with certain aspects of the present description.

FIG. 9 is a flowchart of an example method 900 for a UE to configure dynamic beams based on estimating a channel using sensing beams. The method 900 may be performed by a UE (such as the UE 104, which may include the one or more memories 360 or 806 and which may be the entire UE 104 or a component of the UE 104 such as the dynamic beam component 140, Tx processor 368, the Rx processor 356, the controller/processor 359, and/or processor(s) 808). The method 900 may be performed by the dynamic beam component 140 in communication with the reference signal component 120 of the base station 102. Optional blocks are shown with dashed lines.

At block 910, the method 900 includes estimating a channel using a set of predefined sensing beams to measure reference signals. In some implementations, for example, the UE 104, the Rx processor 356, the controller/processor 359, or the processor(s) 808 may execute the dynamic beam component 140 or the channel estimation component 142 to estimate a channel (e.g., paths 420) using a set of predefined sensing beams (e.g., receive beams 440) to measure reference signals 520. In some implementations, at sub-block 912, the block 910 may include generating an N×N channel correlation matrix 510, where N is a number of antenna elements 502 in the antenna array 500. In some implementations, at sub-block 914, the block 910 may include measuring the RSRP of a respective reference signal for each element of the channel correlation matrix. In some implementations, at sub-block 916, the block 910 may include measuring a channel impulse response of the reference signal at each antenna element. Measuring the channel impulse response at each antenna element may allow the measurements to be performed more quickly. Accordingly, the UE 104, the Rx processor 356, the controller/processor 359, or the processor(s) 808 executing the dynamic beam component 140 or the channel estimation component 142 may provide means for estimating a channel using a set of predefined sensing beams to measure reference signals.

At block 920, the method 900 may include generating a set of dynamic beam weights to maximize a RSRP based on the estimated channel. In some implementations, for example, the UE 104, the Rx processor 356, the controller/processor 359, or the processor 808 (s) may execute the dynamic beam component 140 or the beam weight component 144 to generating a set of dynamic beam weights to maximize a RSRP based on the estimated channel. In some implementations, at sub-block 922, the block 920 may optionally include generating the set of dynamic beam weights are based on an eigenvector of the channel correlation matrix. At sub-block 924, the block 920 may optionally include quantizing values of the eigenvector of the channel correlation matrix. In some implementations, at sub-block 926, the block 920 may optionally include generating receive beam weights to maximize the RSRP of the reference signals. In some implementations, at sub-block 928, the block 920 may optionally include generating reciprocal transmit beam weights based on the receive beam weights. Accordingly, the UE 104, the Rx processor 356, the controller/processor 359, or the processor(s) 808 executing the dynamic beam component 140 or beam weight component 144 may provide means for generating a set of dynamic beam weights to maximize a RSRP based on the estimated channel.

At block 930, the method 900 includes applying the set of dynamic beam weights to an antenna array. In some implementations, for example, the UE 104, the Rx processor 356, the Tx processor 368, the controller/processor 359, or the processor(s) 808 may execute the dynamic beam component 140 and/or the application component 146 to apply the set of dynamic beam weights to an antenna array 500. In some implementations, at sub-block 932, the block 930 may optionally include receiving a reference signal or transmission using the beam weights. In some implementations, at sub-block 934, the block 930 may optionally include transmitting a sounding reference signal or a transmission with the transmit beam weights. Accordingly, the UE 104, the Rx processor 356, the Tx processor 368, the controller/processor 359, or the processor(s) 808 executing the dynamic beam component 140 or application component 146 may provide means for applying the set of dynamic beam weights to an antenna array.

The following provides an overview of aspects of the present disclosure:

Clause 1. A method of wireless communication, comprising: estimating a channel using a set of predefined sensing beams to measure reference signals; generating a set of dynamic beam weights to maximize a reference signal received power (RSRP) based on the estimated channel; and applying the set of dynamic beam weights to an antenna array.

Clause 2. The method of clause 1, wherein estimating a channel comprises generating an N×N channel correlation matrix, where N is a number of antenna elements in the antenna array.

Clause 3. The method of clause 2, wherein the set of dynamic beam weights are based on an eigenvector of the channel correlation matrix.

Clause 4. The method of clause 3, wherein generating a set of dynamic beam weights comprises quantizing values of the eigenvector of the channel correlation matrix.

Clause 5. The method of clause 2 or 3, wherein the set of predefined sensing beams are used to measure the RSRP of a respective reference signal for each element of the channel correlation matrix.

Clause 6. The method of any of clauses 1-5, wherein the set of predefined sensing beams are used to measure a channel impulse response of a reference signal at each antenna element.

Clause 7. The method of any of clauses 1-6, wherein generating the set of dynamic beam weights comprises generating receive beam weights to maximize the RSRP of the reference signals.

Clause 8. The method of clause 7, wherein applying the set of dynamic beam weights comprises receiving a reference signal or transmission using the receive beam weights.

Clause 9. The method of clause 7 or 8, wherein generating the set of dynamic beam weights comprises generating reciprocal transmit beam weights based on the receive beam weights.

Clause 10. The method of clause 9, wherein applying the set of dynamic beam weights comprises transmitting a sounding reference signal or a transmission with the transmit beam weights.

Clause 11. An apparatus for wireless communication, comprising: one or more memories, individually or in combination, having instructions; and one or more processors coupled to the one or more memories and, individually or in combination, configured to: estimate a channel using a set of predefined sensing beams to measure reference signals; generate a set of dynamic beam weights to maximize a reference signal received power (RSRP) based on the estimated channel; and apply the set of dynamic beam weights to an antenna array.

Clause 12. The apparatus of clause 11, wherein to estimate a channel comprises to generate an N×N channel correlation matrix, where N is a number of antenna elements in the antenna array.

Clause 13. The apparatus of clause 12, wherein the set of dynamic beam weights are based on an eigenvector of the channel correlation matrix.

Clause 14. The apparatus of clause 13, wherein to generate a set of dynamic beam weights comprises to quantize values of the eigenvector of the channel correlation matrix.

Clause 15. The apparatus of clause 12 or 13, wherein the set of predefined sensing beams are used to measure the RSRP of a respective reference signal for each element of the channel correlation matrix.

Clause 16. The apparatus of any of clauses 11-14, wherein the set of predefined sensing beams are used to measure a channel impulse response of a reference signal at each antenna element.

Clause 17. The apparatus of any of clauses 11-16, wherein to generate the set of dynamic beam weights comprises to generate receive beam weights to maximize the RSRP of the reference signals.

Clause 18. The apparatus of clause 17, wherein to apply the set of dynamic beam weights comprises to receive a reference signal or transmission using the receive beam weights.

Clause 19. The apparatus of clause 17 or 18, wherein to generate the set of dynamic beam weights comprises to generate reciprocal transmit beam weights based on the receive beam weights.

Clause 20. The apparatus of clause 19, wherein the one or more processors are further configured to transmit a sounding reference signal or a transmission with the transmit beam weights.

Clause 21. An apparatus for wireless communication, comprising: means for estimating a channel using a set of predefined sensing beams to measure reference signals; means for generating a set of dynamic beam weights to maximize a reference signal received power (RSRP) based on the estimated channel; and means for applying the set of dynamic beam weights to an antenna array.

Clause 22. The apparatus of clause 21, wherein the means for estimating the channel is configured to generate an N×N channel correlation matrix, where N is a number of antenna elements in the antenna array.

Clause 23. The apparatus of clause 22, wherein the set of dynamic beam weights are based on an eigenvector of the channel correlation matrix.

Clause 24. The apparatus of clause 23, wherein the means for generating the set of dynamic beam weights is configured to quantize values of the eigenvector of the channel correlation matrix.

Clause 25. The apparatus of clause 22 or 23, wherein the set of predefined sensing beams are used to measure the RSRP of a respective reference signal for each element of the channel correlation matrix.

Clause 26. The apparatus of any of clauses 21-24, wherein the set of predefined sensing beams are used to measure a channel impulse response of a reference signal at each antenna element.

Clause 27. The apparatus of any of clauses 21-26, wherein the means for generating the set of dynamic beam weights is configured to generate receive beam weights to maximize the RSRP of the reference signals.

Clause 28. The apparatus of clause 27, wherein the means for generating the set of dynamic beam weights is configured to generate reciprocal transmit beam weights based on the receive beam weights.

Clause 29. The apparatus of clause 28, further comprising means for transmitting a sounding reference signal or a transmission with the transmit beam weights.

Clause 30. One or more computer-readable media comprising computer executable code, the code when executed by one or more processors causes the one or more processors to, individually or in combination: estimate a channel using a set of predefined sensing beams to measure reference signals; generate a set of dynamic beam weights to maximize a reference signal received power (RSRP) based on the estimated channel; and apply the set of dynamic beam weights to an antenna array.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   estimating a channel using a set of predefined sensing beams to measure reference signals;
   generating a set of dynamic beam weights to maximize a reference signal received power (RSRP) based on the estimated channel; and
   applying the set of dynamic beam weights to an antenna array.

2. The method of claim 1, wherein estimating a channel comprises generating an N×N channel correlation matrix, where N is a number of antenna elements in the antenna array.

3. The method of claim 2, wherein the set of dynamic beam weights are based on an eigenvector of the channel correlation matrix.

4. The method of claim 3, wherein generating a set of dynamic beam weights comprises quantizing values of the eigenvector of the channel correlation matrix.

5. The method of claim 2, wherein the set of predefined sensing beams are used to measure the RSRP of a respective reference signal for each element of the channel correlation matrix.

6. The method of claim 1, wherein the set of predefined sensing beams are used to measure a channel impulse response of a reference signal at each antenna element.

7. The method of claim 1, wherein generating the set of dynamic beam weights comprises generating receive beam weights to maximize the RSRP of the reference signals.

8. The method of claim 7, wherein applying the set of dynamic beam weights comprises receiving a reference signal or transmission using the receive beam weights.

9. The method of claim 7, wherein generating the set of dynamic beam weights comprises generating reciprocal transmit beam weights based on the receive beam weights.

10. The method of claim 9, wherein applying the set of dynamic beam weights comprises transmitting a sounding reference signal or a transmission with the transmit beam weights.

11. An apparatus for wireless communication, comprising:
- one or more memories, individually or in combination, having instructions; and
- one or more processors coupled to the one or more memories and, individually or in combination, configured to:
  - estimate a channel using a set of predefined sensing beams to measure reference signals;
  - generate a set of dynamic beam weights to maximize a reference signal received power (RSRP) based on the estimated channel; and
  - apply the set of dynamic beam weights to an antenna array.

12. The apparatus of claim 11, wherein to estimate a channel comprises to generate an N×N channel correlation matrix, where N is a number of antenna elements in the antenna array.

13. The apparatus of claim 12, wherein the set of dynamic beam weights are based on an eigenvector of the channel correlation matrix.

14. The apparatus of claim 13, wherein to generate a set of dynamic beam weights comprises to quantize values of the eigenvector of the channel correlation matrix.

15. The apparatus of claim 12, wherein the set of predefined sensing beams are used to measure the RSRP of a respective reference signal for each element of the channel correlation matrix.

16. The apparatus of claim 11, wherein the set of predefined sensing beams are used to measure a channel impulse response of a reference signal at each antenna element.

17. The apparatus of claim 11, wherein to generate the set of dynamic beam weights comprises to generate receive beam weights to maximize the RSRP of the reference signals.

18. The apparatus of claim 17, wherein to apply the set of dynamic beam weights comprises to receive a reference signal or transmission using the receive beam weights.

19. The apparatus of claim 17, wherein to generate the set of dynamic beam weights comprises to generate reciprocal transmit beam weights based on the receive beam weights, wherein the one or more processors, individually or in combination, are further configured to transmit a sounding reference signal or a transmission with the transmit beam weights.

20. An apparatus for wireless communication, comprising:
- means for estimating a channel using a set of predefined sensing beams to measure reference signals;
- means for generating a set of dynamic beam weights to maximize a reference signal received power (RSRP) based on the estimated channel; and
- means for applying the set of dynamic beam weights to an antenna array.

* * * * *